US010985986B2

(12) United States Patent
Hoglund et al.

(10) Patent No.: US 10,985,986 B2
(45) Date of Patent: Apr. 20, 2021

(54) SYSTEMS AND METHODS FOR INTERCONNECTING OT AND IT NETWORKS WITHIN A BUILDING AUTOMATION SYSTEM

(71) Applicant: Johnson Controls Technology Company, Auburn Hills, MI (US)

(72) Inventors: David E. Hoglund, Shorewood, WI (US); Xin Zhang, Hartland, WI (US); Eric J. Drury, Lake Zurich, IL (US)

(73) Assignee: Johnson Controls Technology Company, Auburn Hills, MI (US)

(*) Notice: Subject to any disclaimer, the term of this patent is extended or adjusted under 35 U.S.C. 154(b) by 118 days.

(21) Appl. No.: 16/296,004

(22) Filed: Mar. 7, 2019

(65) Prior Publication Data
US 2020/0076735 A1   Mar. 5, 2020

Related U.S. Application Data

(60) Provisional application No. 62/725,819, filed on Aug. 31, 2018.

(51) Int. Cl.
*H04L 12/24* (2006.01)
*H04L 12/46* (2006.01)
(Continued)

(52) U.S. Cl.
CPC ...... *H04L 41/0893* (2013.01); *H04L 12/2803* (2013.01); *H04L 12/2807* (2013.01);
(Continued)

(58) Field of Classification Search
CPC ............ H04L 41/0893; H04L 12/2803; H04L 12/2807; H04L 12/4641; H04L 45/745; H04L 49/25
See application file for complete search history.

(56) References Cited

U.S. PATENT DOCUMENTS 8,363,659 B2   1/2013 Wimmer
8,619,771 B2  12/2013 Lambeth et al.
(Continued)

OTHER PUBLICATIONS

U.S. Appl. No. 15/999,263, filed Aug. 17, 2018, Johnson Controls Technology Company.
(Continued)

*Primary Examiner* — Jael M Ulysse
(74) *Attorney, Agent, or Firm* — Foley & Lardner LLP

(57) ABSTRACT

A network system for interconnecting an operational technology (OT) network and an information technology (IT) network in a building. The network system includes an OT network, an IT network, and a network tool. The network tool is configured to obtain a current network configuration of a plurality of OT network switches in an OT network. The current network configuration includes at least one of the network addresses of the plurality of OT network switches and a routing table associated with the plurality of OT network switches. The network tool is further configured to update the routing table to route network traffic between the OT network and an IT network. The network tool is further configured to update the network addresses of the plurality of OT network switches to have network addresses within at least one subnet of the IT network.

20 Claims, 10 Drawing Sheets

(51) Int. Cl.
*H04L 12/28* (2006.01)
*H04L 29/12* (2006.01)
*H04L 12/935* (2013.01)
*H04L 12/741* (2013.01)
*H04L 12/947* (2013.01)

(52) U.S. Cl.
CPC ........ *H04L 12/4641* (2013.01); *H04L 45/745* (2013.01); *H04L 49/25* (2013.01); *H04L 49/3009* (2013.01); *H04L 61/2015* (2013.01); *H04L 2012/2841* (2013.01)

(56) References Cited

U.S. PATENT DOCUMENTS

| | | | |
|---|---|---|---|
| 9,887,960 B2 | 2/2018 | Chanda et al. | |
| 10,469,600 B2 | 11/2019 | Tsai et al. | |
| 10,536,334 B2 | 1/2020 | Johnsen et al. | |
| 2005/0119767 A1* | 6/2005 | Kiwimagi | G05B 19/042 700/19 |
| 2007/0233323 A1* | 10/2007 | Wiemeyer | H04L 43/0817 700/276 |
| 2009/0271001 A1* | 10/2009 | Westphal | G05B 15/02 700/3 |
| 2010/0280636 A1* | 11/2010 | Holland | H04L 12/2816 700/90 |
| 2011/0040419 A1* | 2/2011 | Kogler | H04L 41/0806 700/293 |
| 2011/0213867 A1* | 9/2011 | McCoy | H04L 69/18 709/223 |
| 2012/0109383 A1* | 5/2012 | Richards | F24F 11/30 700/275 |
| 2013/0064102 A1* | 3/2013 | Chang | H04L 45/245 370/244 |
| 2013/0086195 A1* | 4/2013 | Hiniker | H04L 61/106 709/208 |
| 2013/0346620 A1* | 12/2013 | Gizis | H04L 61/2535 709/226 |
| 2014/0316541 A1* | 10/2014 | Voss | H04L 12/4625 700/90 |
| 2015/0177720 A1* | 6/2015 | Anderson | G05B 15/02 700/90 |
| 2016/0210209 A1* | 7/2016 | Verkaik | G06F 11/2033 |
| 2016/0255175 A1* | 9/2016 | Albrecht | H04L 61/6059 709/245 |
| 2016/0344689 A1* | 11/2016 | Grevers, Jr. | H04L 45/66 |
| 2017/0063624 A1* | 3/2017 | Albrecht | H04L 67/12 |
| 2017/0063632 A1* | 3/2017 | Goliya | H04L 45/586 |
| 2017/0075325 A1* | 3/2017 | Aggarwal | H04L 12/6418 |
| 2017/0250867 A1 | 8/2017 | Kohli et al. | |
| 2017/0324616 A1* | 11/2017 | Johnsen | H04L 41/0816 |
| 2018/0083916 A1* | 3/2018 | Xu | H04L 61/2007 |
| 2018/0316513 A1 | 11/2018 | Gamroth et al. | |
| 2018/0317095 A1 | 11/2018 | Rumler et al. | |
| 2019/0223023 A1* | 7/2019 | Altay | H04W 4/50 |

OTHER PUBLICATIONS

U.S. Appl. No. 16/198,484, filed Nov. 21, 2018, Johnson Controls Technology Company.
U.S. Appl. No. 16/246,080, filed Jan. 11, 2019, Johnson Controls Technology Company.
U.S. Appl. No. 16/246,396, filed Jan. 11, 2019, Johnson Controls Technology Company.

* cited by examiner

SYSTEMS AND METHODS FOR INTERCONNECTING OT AND IT NETWORKS WITHIN A BUILDING AUTOMATION SYSTEM

CROSS-REFERENCE OF RELATED APPLICATION

This application claims the benefit of and priority to U.S. Provisional Patent Application No. 62/725,819, filed Aug. 31, 2018, the entire disclosure of which is incorporated by reference herein.

BACKGROUND

The present disclosure relates generally to a building automation system (BAS). More particularly, the present disclosure relates to interconnecting operational technology (OT) networks and information technology (IT) networks in a BAS.

A BAS is, in general, a system of devices configured to control, monitor, and manage equipment in or around a building or building area. A BAS can include a heating, ventilation, and air conditioning (HVAC) system, a security system, a lighting system, a fire alerting system, another system that is capable of managing building functions or devices, or any combination thereof. BAS devices can be installed in any environment (e.g., an indoor area or an outdoor area) and the environment can include any number of buildings, spaces, zones, rooms, or areas. A BAS can include a variety of devices (e.g., HVAC devices, controllers, chillers, fans, sensors, music, lighting, etc.) configured to facilitate monitoring and controlling the building space.

In some existing systems, an OT network is installed before an IT network. For example, an OT network for an HVAC controls system may be installed before the IT network because the IT equipment needs the cooled air and filtrating. Once the IT network is installed, changes to the OT network may be required. Changes to the OT network may take a lot of time and effort. Thus, it would be desirable to automate the process and provide an interface to allow reconfiguration of an existing OT network to connect to an IT network.

SUMMARY

One implementation of the present disclosure is a network system for a building. The network system includes an operational technology (OT) network. The OT network includes a plurality of OT devices configured to have network addresses within at least one subnet of the OT network. The OT network further includes a plurality of OT network switches communicably coupled to the plurality of OT devices, the plurality of OT network switches configured to have network addresses within the at least one subnet of the OT network. The OT network further includes a routing table associated with the plurality of OT network switches. The network system further includes an information technology (IT) network configured to perform IT operations of the building. The IT network includes a plurality of IT devices configured to have network addresses within at least one subnet of the IT network. The IT network further includes at least one IT network switch communicably coupled to the plurality of IT devices, the at least one IT network switch configured to have at least one network address within the at least one subnet of the IT network. The network system further includes a network tool configured to connect the OT network and the IT network. The network tool includes a processing circuit configured to obtain a current network configuration of the plurality of OT network switches, wherein the current network configuration comprises at least one of the network addresses of the plurality of OT network switches and the routing table associated with the plurality of OT network switches. The processing circuit is further configured to update the routing table to route network traffic between the OT network and the IT network. The processing circuit is further configured to update the network addresses of the plurality of OT network switches to have network addresses within the at least one subnet of the IT network.

In some embodiments, the processing circuit is further configured to receive a new configuration of the OT network required by the IT network for the connecting of the OT network and the IT network and determine if a conflict exists between (1) the current network configuration of the plurality of OT network switches and the plurality of OT devices and (2) the new configuration of the OT network. In some embodiments, the processing circuit is further configured to update a configuration of one or more OT devices, of the plurality of OT devices, that are impacted by the new configuration of the OT network. In some embodiments, the processing circuit is further configured to display, via a client device, the new configuration of the OT network and a list of the OT devices that are impacted by the new configuration of the OT network.

In some embodiments, the processing circuit is further configured to, responsive to determining if a conflict exists, determine whether manual changes are required for the OT network to be connected with the IT network. In some embodiments, the processing circuit is further configured to display, via a client device, the manual changes required for the OT network to be connected with the IT network. In some embodiments, at least one of the plurality of OT network switches functions as an aggregation switch configured to connect the plurality of OT network switches.

Another implementation of the present disclosure is a method for connecting an operational technology (OT) network with an information technology (IT) network in a building automation system. The method includes obtaining a current network configuration of a plurality of OT network switches in an OT network, where the current network configuration comprises at least one of the network addresses of the plurality of OT network switches and a routing table associated with the plurality of OT network switches. The method further includes updating the routing table to route network traffic between the OT network and an IT network. The method further includes updating the network addresses of the plurality of OT network switches to have network addresses within at least one subnet of the IT network.

In some embodiments, the method further includes receiving a new configuration of the OT network that is required by the IT network for the connecting of the OT network and the IT network and determining if a conflict exists between (1) the current network configuration for the plurality of OT network switches and a plurality of OT devices of the OT network and (2) the new configuration of the OT network. In some embodiments, the method further includes updating a configuration of one or more OT devices, of the plurality of OT devices, that are impacted by the new configuration of the OT network.

In some embodiments, the method further includes displaying, via a client device, the new configuration of the OT network and a list of the OT devices that are impacted by the new configuration of the OT network. In some embodiments, the method further includes, responsive to determining if a conflict exists, determining if manual changes are required for the OT network to be connected with the IT network. In some embodiments, the method further includes displaying, via a client device, the manual changes required for the OT network to be connected with the IT network.

Another implementation of the present disclosure is a network tool for connecting an operational technology (OT) network with an information technology (IT) network in a building automation system. The network tool includes a processing circuit configured to obtain a current network configuration of a plurality of OT network switches in an OT network, wherein the current network configuration comprises at least one of the network addresses of the plurality of OT network switches and a routing table associated with the plurality of OT network switches. The processing circuit is further configured to update the routing table to route network traffic between the OT network and an IT network. The processing circuit is further configured to update the network addresses of the plurality of OT network switches to have network addresses within at least one subnet of the IT network.

In some embodiments, the processing circuit is further configured to receive a new configuration of the OT network that is required by the IT network for the connecting of the OT network and the IT network and determine if a conflict exists between (1) the current network configuration for the plurality of OT network switches and a plurality of OT devices of the OT network and (2) the new configuration of the OT network. In some embodiments, the processing circuit is further configured to update a configuration of one or more OT devices, of the plurality of OT devices, that are impacted by the new configuration of the OT network. In some embodiments, the processing circuit is further configured to display, via, a client device, the new configuration of the OT network and a list of the OT devices that are impacted by the new configuration of the OT network.

In some embodiments, the processing circuit is further configured to responsive to determining if a conflict exists, determine if manual changes are required for the OT network to be connected with the IT network. In some embodiments, the processing circuit is further configured to display, via a client device, the manual changes required for the OT network to be connected with the IT network. In some embodiments, at least one of the plurality of OT network switches functions as an aggregation switch such that it is configured to connect the plurality of OT network switches.

DETAILED DESCRIPTION

Referring generally to the FIGURES, systems and methods for interconnecting networks within a building automation system (BAS) are described, according to the various exemplary embodiments. It may be desired to interconnect the operational technology (OT) network of a BAS with the information technology (IT) network of the BAS. In some embodiments, the OT network is installed before the IT network for various reasons. For example, the OT network of an HVAC controls system may need to be installed before the IT network because the IT equipment needs the cooled air and filtration. However, upon installation of the IT network, changes may need to be made to the OT network to allow communication between the two. This may require a substantial amount of time and effort to make the necessary changes. By creating a configuration tool, the process of interconnecting the networks may be automated and may find the smallest set of changes that need to be made, in turn minimizing the required time and effort.

Building HVAC Systems and Building Automation Systems

Figure 1:
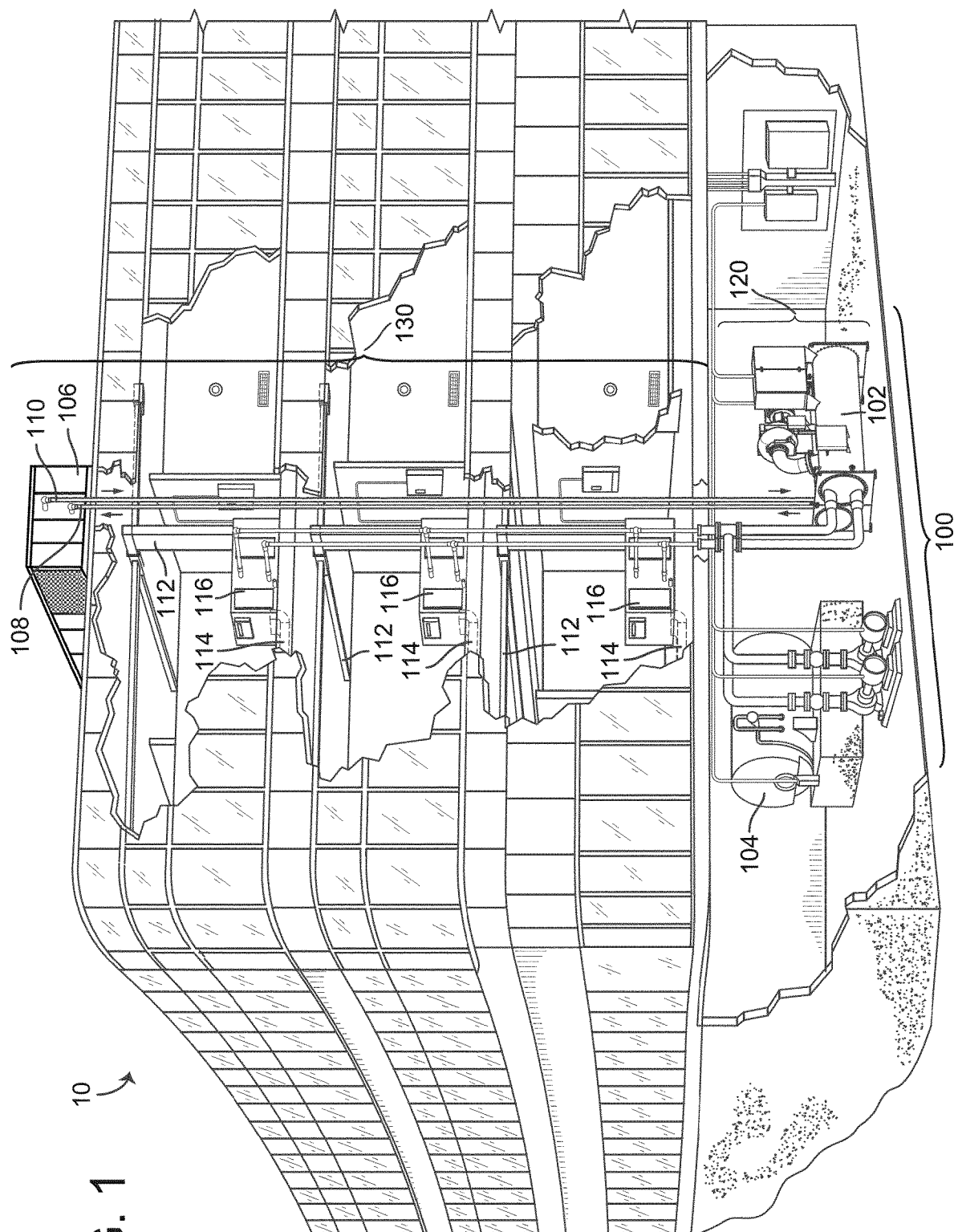
FIG. 1 is drawing of a building equipped with a heating, ventilating, and air conditioning (HVAC) system, according to some embodiments.
Figure 2:
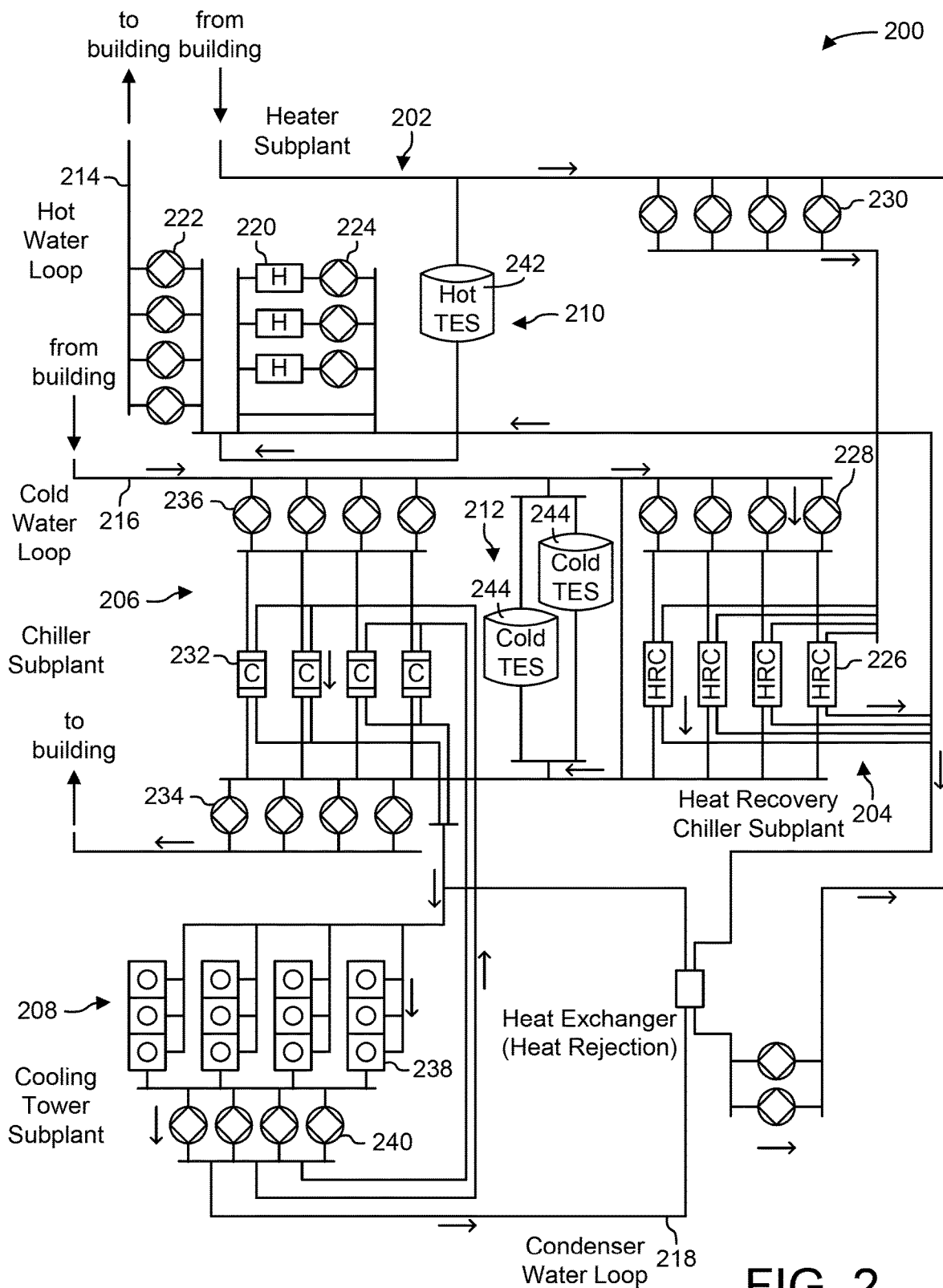
FIG. 2 is a block diagram of a waterside system which can be used to serve the building of FIG. 1, according to some embodiments.
Figure 3:
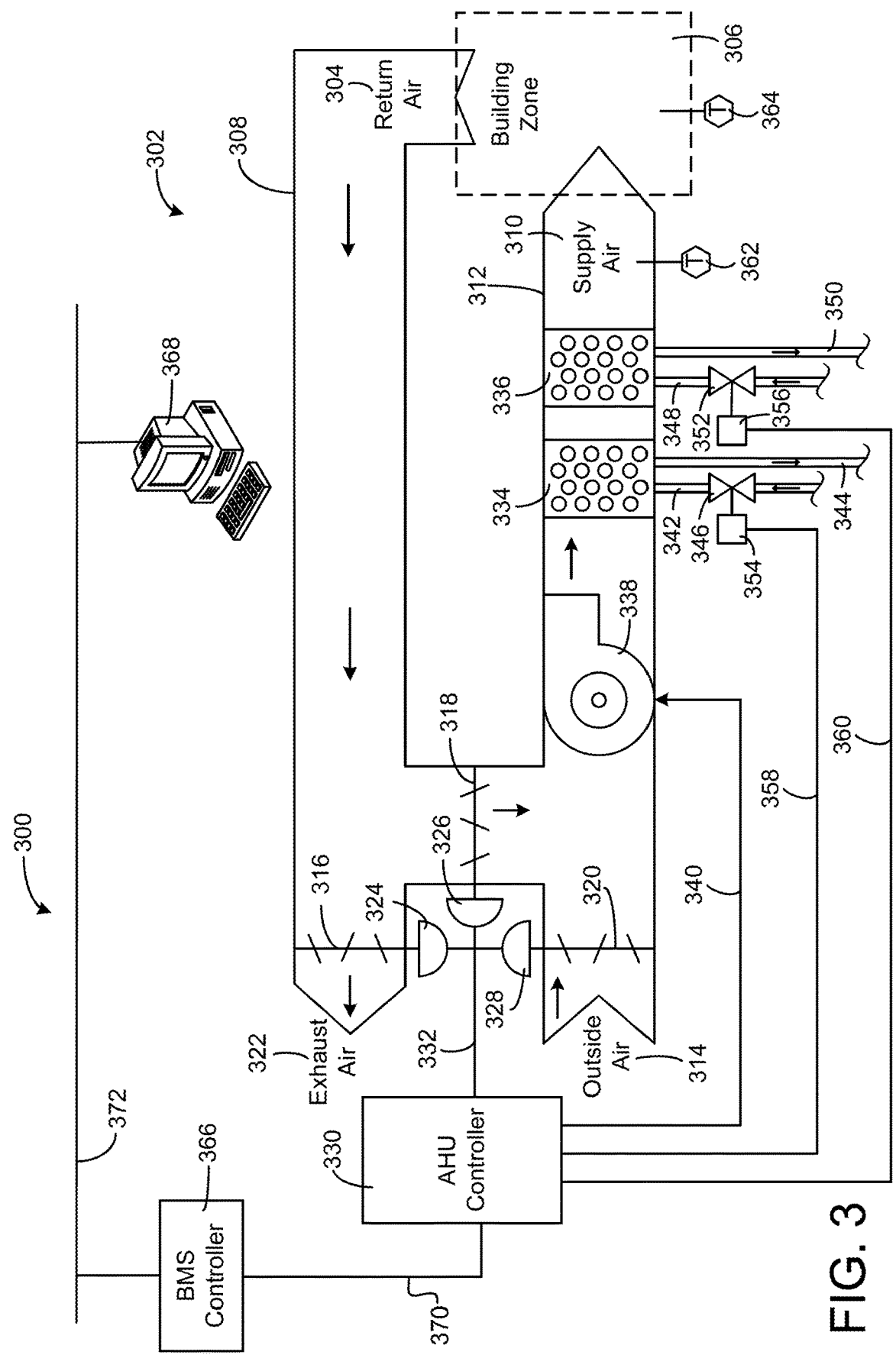
FIG. 3 is a block diagram of an airside system which can be used to serve the building of FIG. 1, according to some embodiments.
Figure 4:
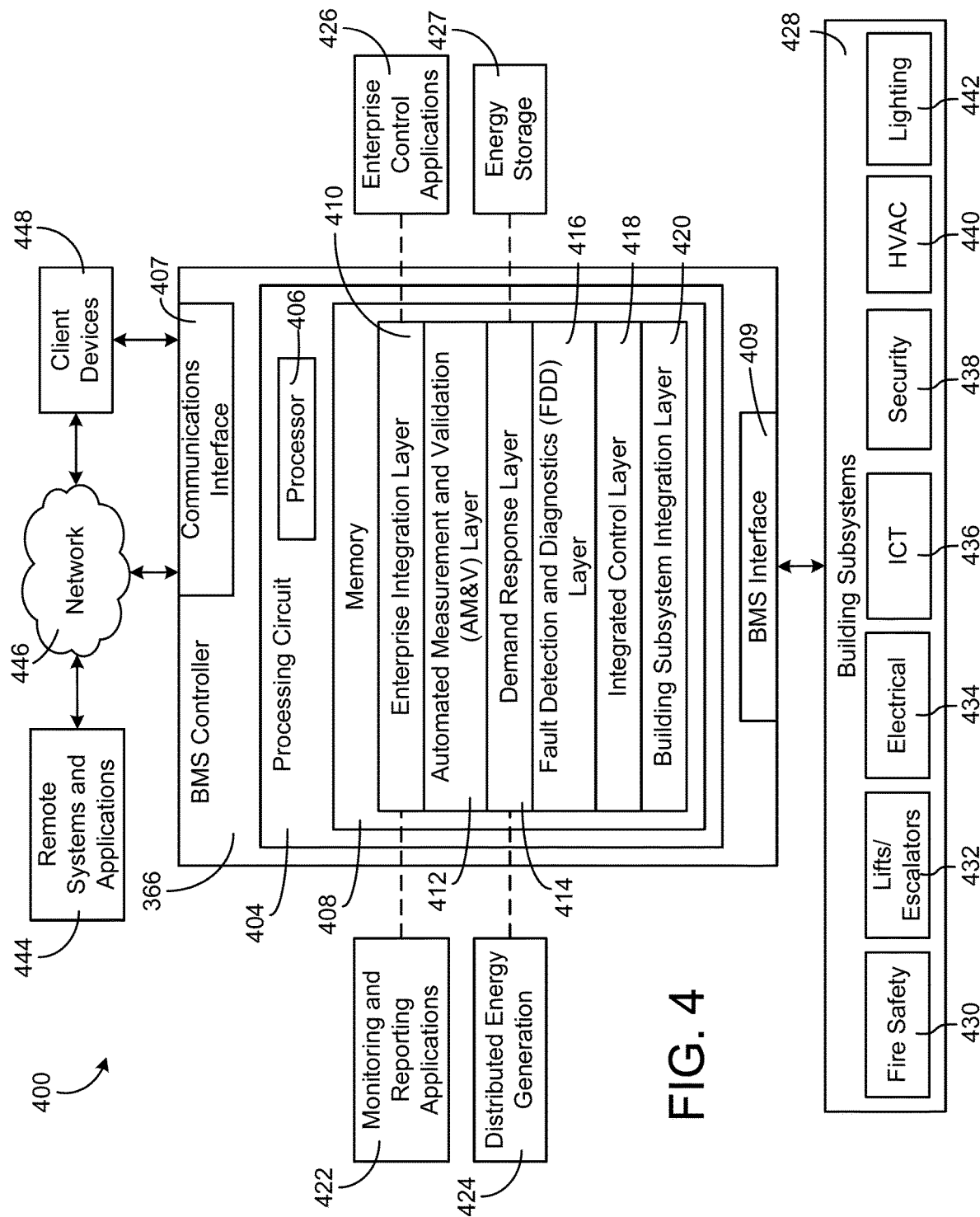
FIG. 4 is a block diagram of a building automation system (BAS) which can be used to monitor and control the building of FIG. 1, according to some embodiments.

Referring now to FIGS. 1-4, several building automation systems (BAS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BAS which can be used to monitor and control building 10.

Building and HVAC System

Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes a HVAC system 100. HVAC system 100 can include a number of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 1=–30 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a number of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a number of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a number of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a number of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a number of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and can correlate with the amount of energy consumed to achieve a desired supply air temperature. AHU 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Building Automation Systems

Referring now to FIG. 4, a block diagram of a building automation system (BAS) 400 is shown, according to some embodiments. BAS 400 can be implemented in building 10 to automatically monitor and control various building functions. BAS 400 is shown to include BAS controller 366 and a number of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a number of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a number of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Connecting of OT and IT Networks within a Building Automation System

As described above, the present disclosure includes systems and methods that can interconnect operational technology (OT) and information technology (IT) networks within a building automation system (BAS). FIGS. 5-9B show various embodiments of the present disclosure.

Figure 5:
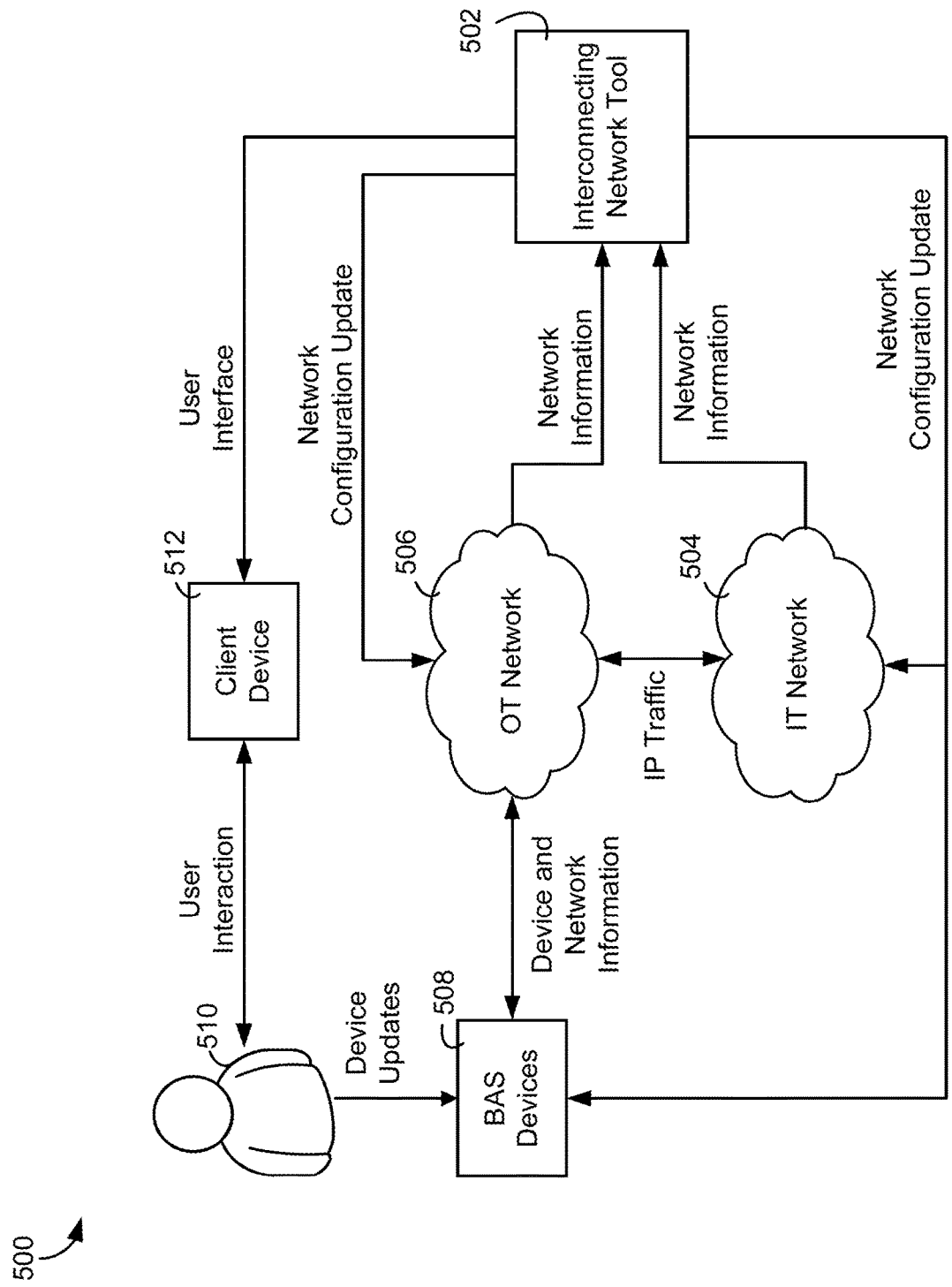
FIG. 5 is a block diagram of a system which can be used to interconnect networks within the building of FIG. 1, according to some embodiments.

Referring now to FIG. 5, a block diagram of a system which can be used to interconnect networks within the building of FIG. 1 is shown, according to an exemplary embodiment. System 500 can be implemented in building 10 to interconnect the operational technology (OT) and information technology (IT) networks of the building. System 500 is shown to include operational technology (OT) network 506, information technology (IT) network 504, client device 512, building automation system (BAS) devices 508, user 510, and interconnecting network tool 502. In some embodiments, some components of system 500 (i.e. OT network 506, IT network 504, user 510, etc.) can be in one or more locations remote from building 10 and can communicate with other components of system 500 via one or more communication networks.

System 500 is shown to include an operational technology (OT) network 506. The OT network 506 may be used to monitor and/or facilitate communication between physical equipment and processes within the BAS. OT devices may communicate with one another via OT network 506. OT devices include BAS controllers and/or BAS devices. The BAS controllers can be any of the controllers as described above in relation to FIGS. 1-4. The BAS devices can be any of the devices in the building subsystems, such as HVAC devices, lighting devices, fire safety devices, etc., as described above in relation to FIGS. 1-4.

The OT network 506 may be installed in segments, for example corresponding to the physical layout of the building. Within each segment, packets of data may be handled using the protocols of layer 2 in the Open System Interconnection (OSI) model. For example, packets of data may be handled via Ethernet, fiber channels, media access control (MAC) addresses, and/or switches. Communication between segments may be handled using the protocols of layer 3 in the OSI model. For instance, communication between segments may be handled using internet protocol version 4 (IPv4), internet protocol version 6 (IPv6), internet control message protocol (ICMP), multiprotocol label switching (MPLS), address resolution protocol (ARP), routing, and/or IP addresses. Traffic within the OT network 506 may be controlled using static routing statements. The routing statements can direct packets of data from one segment to all other segments. Prior to using interconnecting network tool 502, OT network 506 and IT network 504 may be unable to communicate such that no IP traffic flows between OT network 506 and IT network 504. However, after using interconnecting network tool 502, IP traffic may be routed between OT network 506 and IT network 504 as shown in FIG. 5. The architecture of OT network 506 and its functionality is described in greater detail below in relation to FIGS. 7 and 8.

System 500 is shown to include an information technology (IT) network 504. IT network 504 can be configured to perform various IT functions of the building. IT network 504 may be configured to facilitate communication between a variety of IT devices of the building. For example, IT network 504 may be used to facilitate communication between printers, phones, routers, and/or IoT devices. IT network 504 may direct traffic to and from OT network 506. The architecture of IT network 504 and its functionality is described in greater detail below in reference to FIGS. 7 and 8.

System 500 is shown to include client device 512. Client device 512 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with system 500, its subsystems, and/or devices. Client device 512 can be a computer workstation, a client terminal, a remote or local interface, or any other type of user interface device. Client device 512 can be a stationary terminal or a mobile device. For example, client device 512 can be a desktop computer, a computer server with a user interface, a laptop computer, a tablet, a smartphone, a PDA, or any other type of mobile or non-mobile device. A user 510 may operate client device 512, for example via a user interface. Interconnecting network tool 502 may generate the user interface and display it on client device 512. User 510 may indirectly interact, or communicate, with interconnecting network tool 502 via client device 512.

System 500 is shown to include a building automation system (BAS) devices 508. BAS devices 508 may be any device in building 10 or system 100. BAS devices 508 may be one or more devices used in a subsystem of the BAS. For example, BAS devices 508 may be an HVAC device. BAS devices 508 may be any device used to perform operations and/or processes of the BAS. BAS devices 508 may communicate with one another and/or with other systems and/or devices of system 500 via OT network 506. OT network 506 may request various attributes of BAS devices 508, such as IP address. BAS devices 508 may receive network information from OT network 506, such as network switch configurations. BAS devices 508 can be a device in the building automation system as described in relation to FIGS. 1-4.

System 500 is shown to include a user 510. User 510 may be a BAS site manager, a member of the technology team, an employee of the BAS site, and/or anyone responsible for the migration of networks. In some embodiments, user 510 can be a field engineer/technician and/or anyone who is to configure networks. User 510 can provide system inputs and receive system outputs via client device 512. User 510 may manually update a BAS device 508. For example, user 510 may reconfigure and/or restart BAS device 508. User 510 may also push switch configuration files out to the network switches of the OT network 506 and/or IT network 504.

System 500 is shown to include interconnecting network tool 502. Interconnecting network tool 502 can be configured to connect an operational technology (OT) network and an information technology (IT) network in a building automation system (BAS). OT network 506 may be installed prior to IT network 504 being installed. Once IT network 504 is installed, OT network 506 may require changes to allow communication between the two networks. Interconnecting network tool 502 can be configured to determine and handle these required changes. Interconnecting network tool 502 may receive a variety of network information from OT network 506 and/or IT network 504. For example, interconnecting network tool 502 may receive network switch configurations from OT network 506. By way of another example, interconnecting network tool 502 may receive IP address of devices on the network from IT network 504. Interconnecting network tool 502 can be configured to push updated network configurations to OT network 506 and/or IT network 504. An updated network configuration for OT network 506 may include, for example, updates to the routing tables and/or IP addresses of OT network switches within OT network 506. An updated network configuration for IT network 504 may include updates to the routing tables of network switches within IT network 504 to route traffic to OT network 506. In some embodiments, interconnecting network tool 502 may push updated network configurations to BAS devices 508. Alternatively, BAS devices 508 may obtain their configuration via DHCP from OT network 506. Furthermore, interconnecting network tool 502 may present a user interface via client device 512. The user interface may include warning messages, notifications, or may prompt a user (i.e. user 510) to perform an action. The various components and functions of interconnecting network tool 502 are described in greater detail below in reference to FIG. 6.

Figure 6:
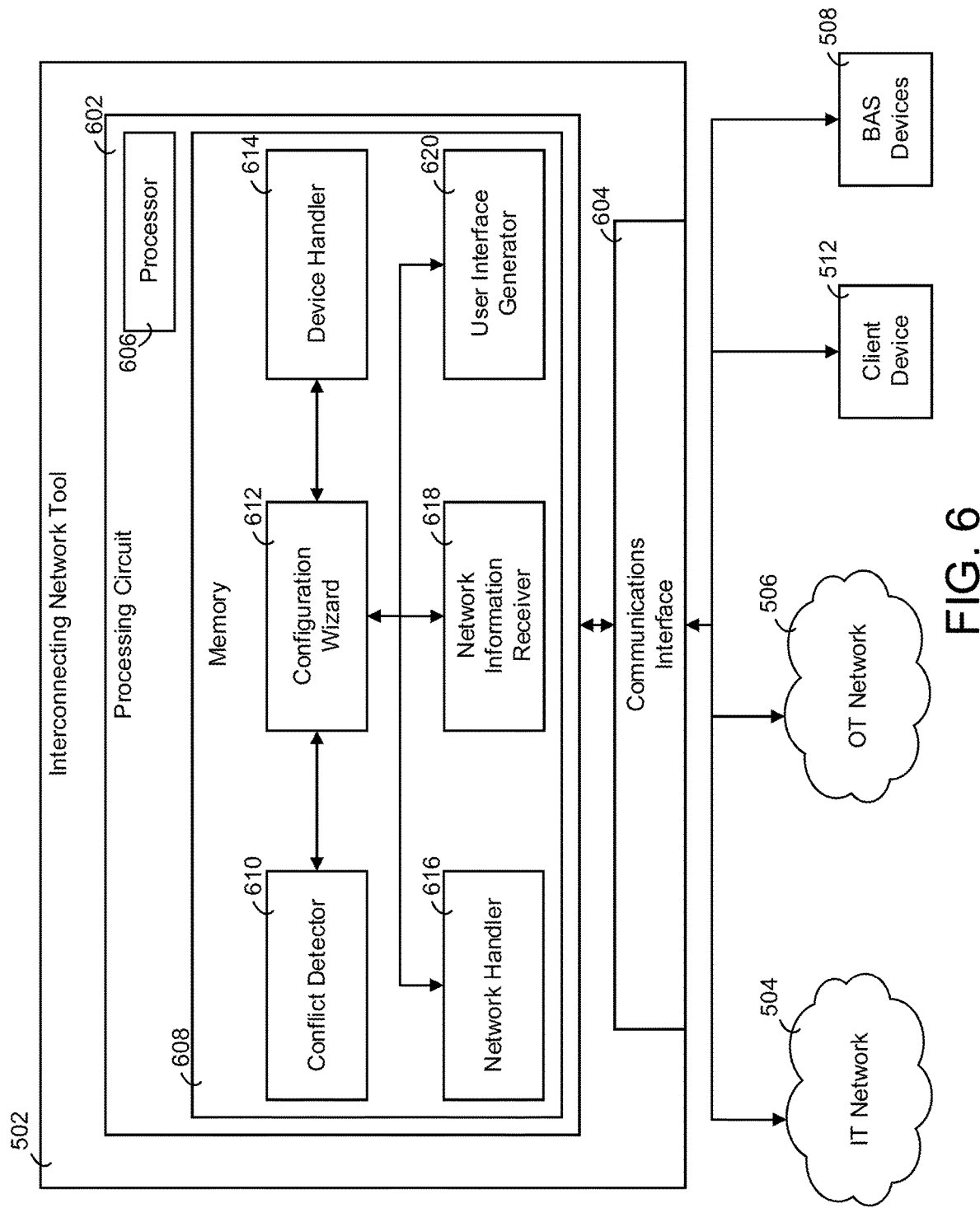
FIG. 6 is a block diagram of the interconnecting network tool of FIG. 6 shown in greater detail, according to some embodiments.

Referring now to FIG. 6, a block diagram of the interconnecting network tool of FIG. 6 is shown in greater detail, according to an exemplary embodiment. Interconnecting network tool 502 can be configured to connect an operational technology (OT) network and an information technology (IT) network in a building and/or BAS. In some embodiments, interconnecting network tool 502 can be implemented in building 10. One or more components of interconnecting network tool 502 may be implemented to perform various steps of process 900 described in reference to FIGS. 9A and 9B. Interconnecting network tool 502 is shown to include a processing circuit 602 and a communications interface 604. Interconnecting network tool 502 is shown to interact with IT network 504, OT network 506, client device 512, and/or BAS devices 508.

Interconnecting network tool 502 is shown to include a communications interface 604. Interface 604 can facilitate communications between interconnecting network tool 502 and networks (e.g., OT network 506, IT network 504, etc.) for interconnecting the networks within building 10. Interface 604 can also facilitate communications between interconnecting network tool 502 and external devices (e.g., client devices 512, BAS devices 508, etc.) to provide user interfaces to be displayed.

Communications interface 604 can be or include wired or wireless communications interfaces (e.g., jacks, antennas, transmitters, receivers, transceivers, wire terminals, etc.) for conducting data communications with networks or other external systems or devices. In various embodiments, communications via interface 604 can be direct (e.g., local wired or wireless communications) or via a communications network 446 (e.g., a WAN, the Internet, a cellular network, etc.). For example, interface 604 can include an Ethernet card and port for sending and receiving data via an Ethernet-based communications link or network. In another example, interface 604 can include a Wi-Fi transceiver for communicating via a wireless communications network. In another example, interface 604 can include cellular or mobile phone communications transceivers. Communications interface 604 may include one or more interfaces to enable interconnecting network tool 502 to access a network such as a Local Area Network (LAN), a Wide Area Network (WAN), a Personal Area Network (PAN), or the Internet through a variety of wired and/or wireless or cellular connections.

Still referring to FIG. 6, interconnecting network tool 502 is shown to include a processing circuit 602 including a processor 606 and memory 608. Processing circuit 602 can be communicably connected to communications interface 604 such that processing circuit 602 and the various components thereof can send and receive data via interface 604. Processor 606 can be implemented as a general purpose processor, an application specific integrated circuit (ASIC), one or more field programmable gate arrays (FPGAs), a group of processing components, or other suitable electronic processing components.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 608 can be or include volatile memory or non-volatile memory. Memory 608 can include database components, object code components, script components, or any other type of information structure for supporting the various activities and information structures described in the present application. According to some embodiments, memory 608 is communicably connected to processor 606 via processing circuit 602 and includes computer code for executing (e.g., by processing circuit 602 and/or processor 606) one or more processes described herein.

In some embodiments, memory 608 can include at least a conflict detector 610, configuration wizard 612, device handler 614, network handler 616, network information receiver 618, and user interface generator 620. In other embodiments, more, less, or different modules or components can be stored in memory 608. In some embodiments, the modules 610-620 can be implemented in one apparatus, such as the component 502. In other embodiments, each of the modules 610-620 can be implemented in different and separate apparatuses and/or executed by different and separate processors, or a combination thereof. In some embodiments, modules 610-620 stored in a non-transitory computer readable medium (i.e. memory 608) can be executed by the processor 606 to perform operations as described herein. In some embodiments, each of the modules 610-620 or a combination of some of the modules 610-620 can be implemented as hardware circuits.

Memory 608 is shown to include network information receiver 618. Network information receiver 618 can be configured to receive information specific to OT network 506 and/or IT network 504. Information can be received from one or more storage devices or databased, another device within or outside of system 500, and/or OT network 506 and IT network 504. In some embodiments, network information receiver 618 may receive information of the BAS devices that are connected via OT network 506 and the relationships between the devices (i.e. which controllers will be supervised by a network controller, etc.). In certain embodiments, network information receiver 618 may receive information regarding how devices are connected on the network (i.e. via star/home run, daisy chain, or redundant ring). In other embodiments, network information receiver 618 may send network information to configuration wizard 612.

Memory 608 is shown to include network handler 616. Network handler 616 can be configured to receive instructions from configuration wizard 612 to update various attributes of OT network 506 and/or IT network 504. For example, network handler 616 may be instructed to update the IP address of one of the subnets in OT network 506 to be an IP address in the network address space of the IT network 504. Network handler 616 may communicate with OT network 506 and/or IT network 504 via communications interface 604. In some embodiments, network handler 616 may update one or more routing tables such that traffic from one network gets routed to another. For example, network handler 616 may update the routing table of OT network 506 so that some of the IP traffic to OT network 506 gets routed to IT network 504.

Still referring to FIG. 6, memory 608 is shown to include configuration wizard 612. Configuration wizard 612 can be configured to receive and handle network configurations. For example, configuration wizard 612 may receive a configuration of OT network 506 from network information receiver 618. Configuration wizard 612 may determine how to connect OT network 506 and IT network 504.

Memory 608 is shown to include conflict detector 610. Conflict detector 610 may be configured to receive one or more network configurations. For example, conflict detector 610 may receive a current network configuration of OT network 506 and a required network configuration of OT network 506 necessary to be connected with IT network 504. Conflict detector 610 may receive the network configurations from configuration wizard 612. Conflict detector 610 may compare the current network configuration and the required network configuration and determine if conflicts exist. If no conflicts exist, the process of connecting IT network 504 and OT network 506 may continue. If conflicts exist, conflict detector 610 may inform configuration wizard 612 of the conflict. For example, conflict detector 610 may determine that addresses in a subnet of the current network configuration overlap with addresses in a subnet of the require network configuration. Conflict detector 610 may detect that conflict and generate an alert for configuration wizard 612. In response to being informed of a conflict, configuration wizard 612 may modify the configuration of OT network 506 to resolve the conflict (e.g., by modifying the range of overlapping IP addresses used by OT network 506), allowing the interconnection of IT network 504 and OT network 506 to proceed.

Still referring to FIG. 6, memory 608 is shown to include device handler 614. Device handler 614 may be configured to update configurations of a plurality of devices, for example BAS devices 508. Device handler 614 may receive a list of a devices that need to be updated from configuration wizard 612. Device handler 614 may communicate with the plurality of devices via OT network 506 and/or IT network 504. Device handler 614 can be configured to update various attributes of the devices relating to the network. For example, device handler 614 may update the default gateway of BAS device 508. In some embodiments, device handler 614 is configured to update the configuration of any BAS devices 508 that have IP addresses statically assigned. Updating the configuration of a BAS device 508 with a statically-assigned IP address may include updating both the IP address of the BAS device 508 as well as the default gateway of the BAS device 508. For any BAS devices 508 that receive their IP addresses via DCHP, the updated network configurations provided by interconnecting network tool 502 to switches of OT network 506 may include updated DCHP configurations. The updated DHCP configurations may result in the configurations of BAS devices 508 to be updated automatically without any direct manual intervention.

Memory 608 is shown to include user interface generator 620. User interface generator 620 may be configured to generate user interfaces to be displayed on a client device 512 or BAS device 508 via communications interface 604. User interface generator 620 may receive data and a trigger to generate and display a user interface to be presented. For example, user interface generator 620 may receive a notification from configuration wizard 612 to display a message saying that configuration of OT network 506 is complete. User interface generator 620 may format the response appropriately and display it on a client device 512 via communications interface 604. In some embodiments, user interface generator 620 may receive actions from a client device 512 (i.e., button click, etc.).

Figure 7:
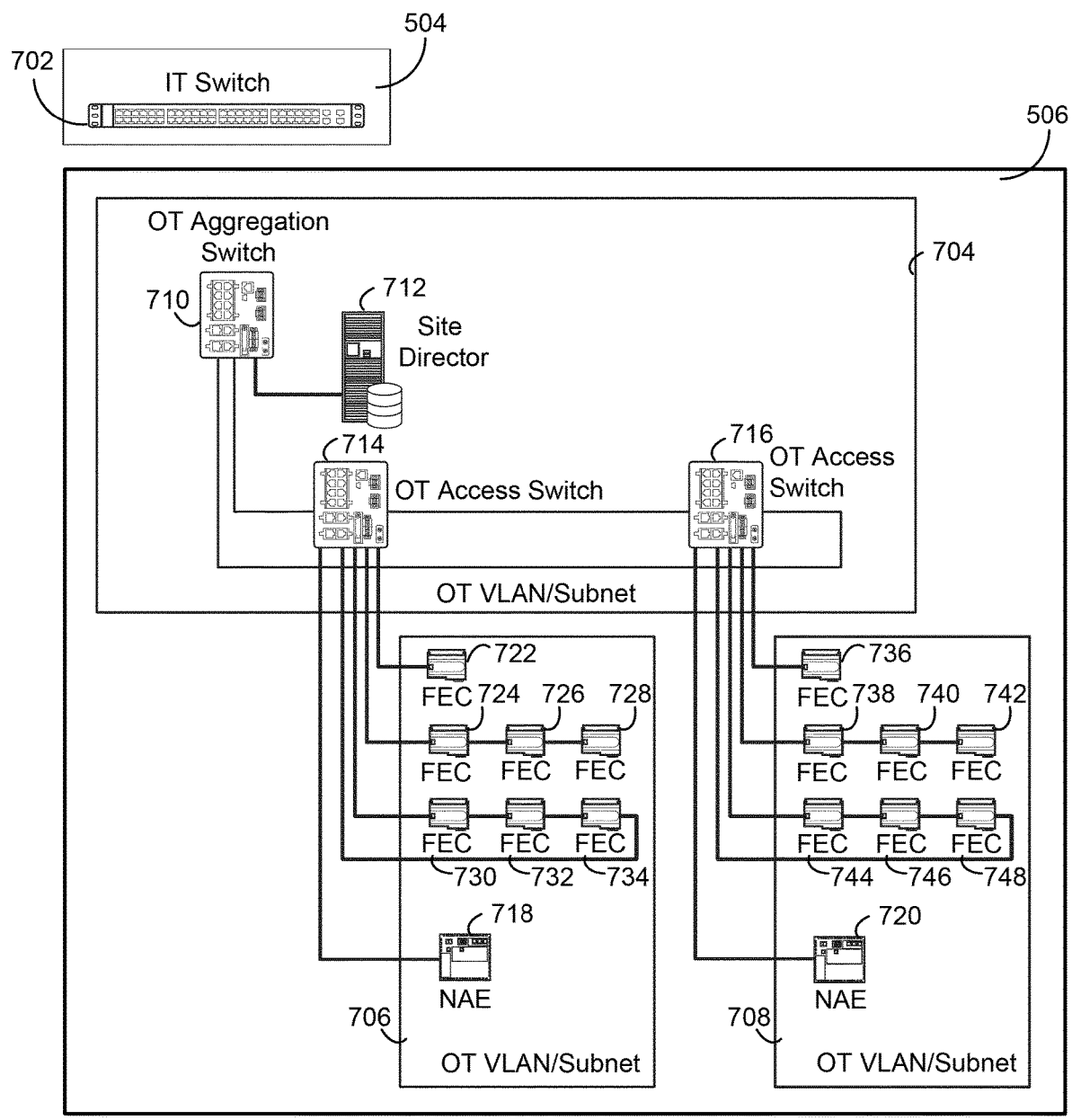
FIG. 7 is a schematic diagram of an isolated OT network which can be used by the interconnecting network tool of FIG. 6, according to some embodiments.
Figure 8:
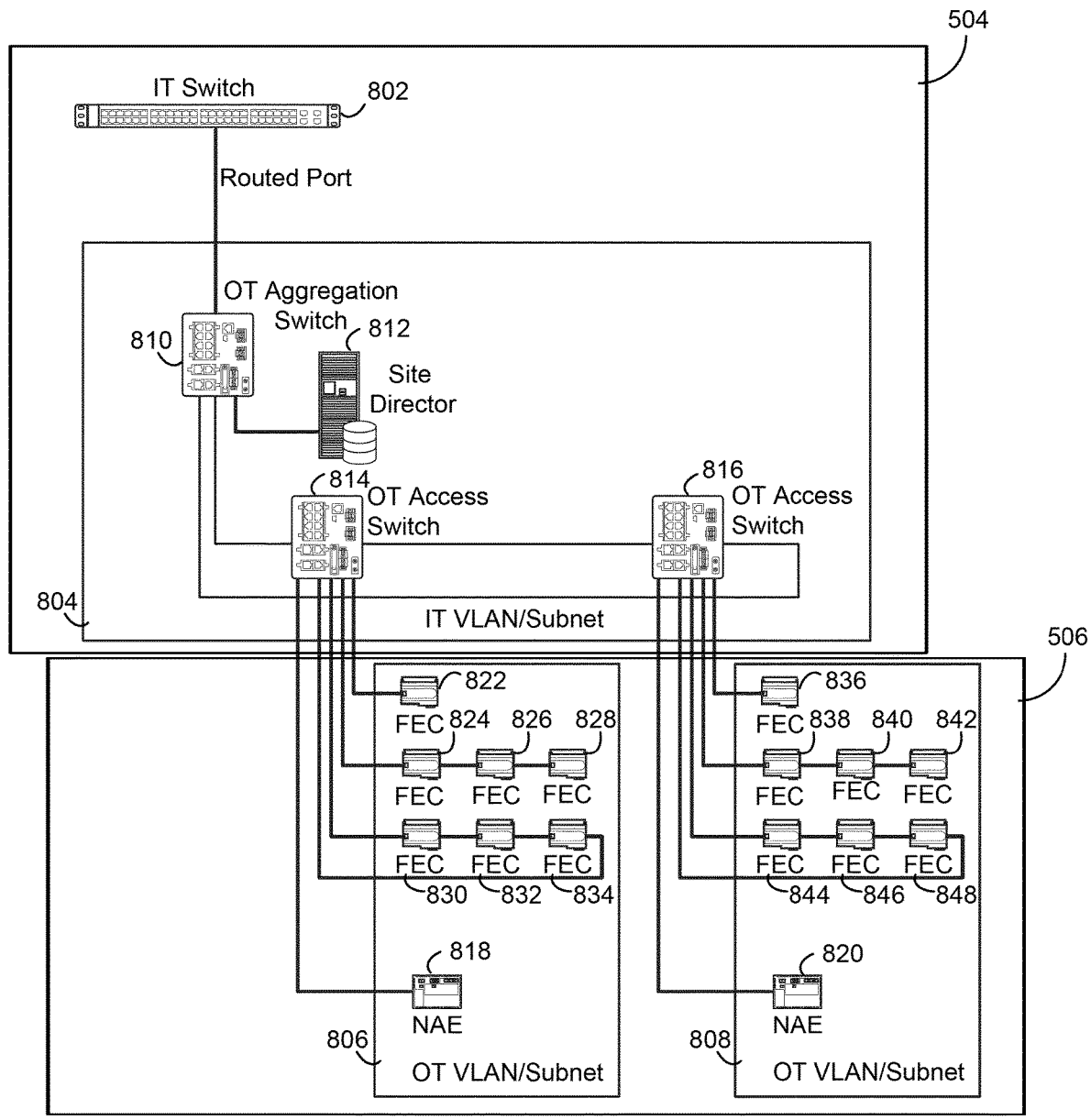
FIG. 8 is a schematic diagram illustrating an OT network interconnected to an IT network, according to some embodiments.

Referring now to FIG. 7, a schematic diagram of an isolated OT network 506 which can be used by the interconnecting network tool 502 of FIG. 6 is shown, according to exemplary embodiment. The schematic diagram demonstrates how OT network 506 is secluded from IT network 504 prior to using the interconnecting network tool 502, as described in reference to FIGS. 5 and 6. Process 900 may be performed to connect the networks in FIG. 7 to be as shown in FIG. 8.

IT network 504 can be configured to perform IT operations of a BAS. IT network 504 is shown to include IT switch 702. IT switch 702 may be any of a variety of switches within IT network 504 including, for example, an IT distribution switch, an IT core switch, or an IT access switch. IT switch 702 may be configured to have a network address within a subnet of IT network 504 and may exist within a subnet of IT network 504. In some embodiments, IT switch 702 is communicably coupled to one or more IT devices communicating on IT network 504. While FIG. 7 shows example components of IT network 504, in other embodiments, IT network 504 can include additional, different, fewer, and/or differently-arranged components than those depicted in FIG. 7. For example, while FIG. 7 shows one IT switch 702, IT network 504 can have any number of IT switches.

OT network 506 is shown to include a plurality of OT virtual local area network (VLAN)/subnets 704, 706, 708. OT VLAN/subnet 704 is shown to include a plurality of OT access switches 714, 716. Each of the OT access switches 714, 716 can connect a plurality of other devices via a plurality of ports of the access switch. In some embodiments, the plurality of other devices exists in one or more OT VLAN/subnets 706, 708. For example, as illustrated in FIG. 7, OT access switch 714 can connect one or more network controllers 718 and/or one or more BAS controllers 722-734 via a plurality of ports of OT access switch 714. In some embodiments, one or more of the BAS controllers and/or BAS devices may not connect directly to the OT access switch due to, for example, the BAS controllers and/or BAS devices not having the hardware capability to connect to a switch port. In those embodiments, the BAS controllers and/or BAS devices may connect to a network controller which connects to the access switch. In some embodiments, access switches can communicate with each other, for example, via a trunk. The controllers 718, 720 can be Network Automation Engines (NAEs) or other network controllers, in some embodiments. In other embodiments, the controls 722-734 and 736-748 can be Field Equipment Controllers (FECs) or other controllers. In some embodiments, OT access switches 714, 716 may provide IP addresses to the controllers and/or devices connected to them via Dynamic Host Control Protocol (DHCP).

Devices in OT VLAN/subnets 704, 706, 708 may communicate throughout the network in a variety of ways. Devices may be connected directly to an OT access switch (i.e. OT access switch 714, 716). In some embodiments, a group of devices may be part of a 'daisy chain,' where multiple devices are connected together in a sequence. In other embodiments, a group of devices may participate in a media redundancy protocol (MRP) ring. In certain embodiments, all devices within OT network 506 are directly reachable from and to each other within OT network 506.

In some embodiments, OT VLAN/subnet 704 may include site director 712. Site director 712 may be a component of BAS 400 (e.g., a BAS site director) hosted by OT network 506. In some embodiments, site director 712 is as repository for alarms, events, trend data, or other data generated by other BAS devices 508 and may act as a portal for viewing/accessing the configuration of the other BAS devices 508. Site director 712 may have a static IP address from the IP address space of OT network 506. Site director 712 may reside in the same OT VLAN/subnet (i.e. OT VLAN/subnet 704) as OT aggregation switch 710 and OT access switches 714, 716. Site director 712, OT aggregation switch 710, and OT access switches 714, 716 can have static IP addresses from the network address space of OT network 506. Devices in OT network 506 may have dynamic IP addresses from the network address space of OT network 506 provided by the connected OT access switch. In some embodiments, site director 712 is configured to obtain its configuration (e.g., IP address and default gateway) via DHCP from OT network 506. In such an embodiment, interconnecting network tool 502 may update the configuration of the DHCP server in OT network 506 as part of the new configuration in order to connect OT network 506 with IT network 504.

In some embodiments, OT network 506 is shown to include OT aggregation switch 710. OT aggregation switch 710 may exist in OT VLAN/subnet 704. As illustrated in FIG. 7, OT aggregation switch 710 can connect the plurality of OT access switches 714, 716. OT aggregation switch 710 can contain a routing table that routes traffic depending on the destination IP address. Prior to connecting OT network 506 and IT network 504 (as shown in FIG. 7), OT aggregation switch 710 may not be configured to route traffic from OT network 506 to IT network 504. However, after connecting OT network 506 and IT network 504, OT aggregation switch 710 may be configured to route traffic from site director 712 to either one of the controllers and/or devices or IT network 504. Depending on the architecture of OT network 506, OT network 506 may include OT aggregation switch 710. For example, if it is determined that a separate aggregation switch is included in the OT network architecture for aggregation of the access switches and routing between the access switches, OT network 506 may include at least one OT aggregation switch 710. In some embodiments, OT network 506 may not include OT aggregation switch 710, and the functionality of the aggregation switch may be configured on an access switch, just as in some embodiments that the access switch functionality may be configured on an aggregation switch. While FIG. 7 shows example components of OT network 506, in other embodiments, OT network 506 can include additional, different, fewer, and/or differently-arranged components than those depicted in FIG. 7. For example, while FIG. 7 shows two OT access switches, OT network 506 can have any number of OT access switches. The configuration and arrangement of each switch, control, and device, etc. as shown in FIG. 7 are for illustrative purposes only and are not limiting.

Referring now to FIG. 8, a schematic diagram illustrating an OT network interconnected to an IT network is shown, according to an exemplary embodiment. FIG. 8 may be a result of performing functions of interconnecting network tool 502 and/or process 900 described with reference to FIGS. 9A and 9B. The architecture of IT network 504 and OT network 506 may be similar to the architecture described in reference to FIG. 7.

Upon connecting OT network 506 and IT network 504, for example via process 900 or by performing various functions of interconnecting network tool 502, the architecture of IT network 504 and OT network 506 may change from the architecture described in reference to FIG. 7. Once connected, OT aggregation switch 810, site director 812, and a plurality of OT access switches 815, 816 may reside in IT VLAN/subnet 804. OT aggregation switch 810, site director 812, and the plurality of OT access switches 815, 816 may be similar to, or the same as the components described in reference to FIG. 7. Now residing in IT VLAN/subnet 804, OT aggregation switch 810, site director 812, and the plurality of OT access switches 815, 816 can have static IP addresses from the network address space of the IT network 504. Traffic (i.e. IP traffic) can be routed between OT aggregation switch 810 and IT switch 802 via a routed port. The routed port can allow for communication between IT network 504 and OT network 506. OT aggregation switch 810 can contain a routing table that routes traffic depending on the destination IP address. OT aggregation switch 810 may be configured to route traffic from site director 812 to either one of the controllers and/or devices or IT network 504. The routing table may be updated by process 900 and/or interconnecting network tool 502 to re-route the IP traffic appropriately. OT access switches 814, 816 and site director 812 may be visible and accessible from IT network 504 via OT aggregation switch 810 and the routed port.

OT network 506 may still contain a plurality of OT VLAN/subnets 806, 808. OT VLAN/subnets 806, 808 may be similar to, or the same as, the OT VLAN/subnets described in reference to FIG. 7. In certain embodiments, a plurality of devices can exist in one or more OT VLAN/subnets 706, 708. For example, as illustrated in FIG. 7, OT VLAN/subnet 806 can contain network controller 818 and BAS controllers 822-834. By way of another example, OT VLAN/subnet 808 can contain network controller 820 and BAS controllers 836-848. Network controllers 818, 820 and BAS controllers 822-848 can be similar to, or the same as, the controllers described in reference to FIG. 7. OT VLAN/subnets 806, 808 and their respective controllers and/or devices may have dynamic IP addresses from the network address space of OT network 506. OT VLAN/subnets 806, 808 may not be visible or accessible from IT network 504.

Figure 9A:
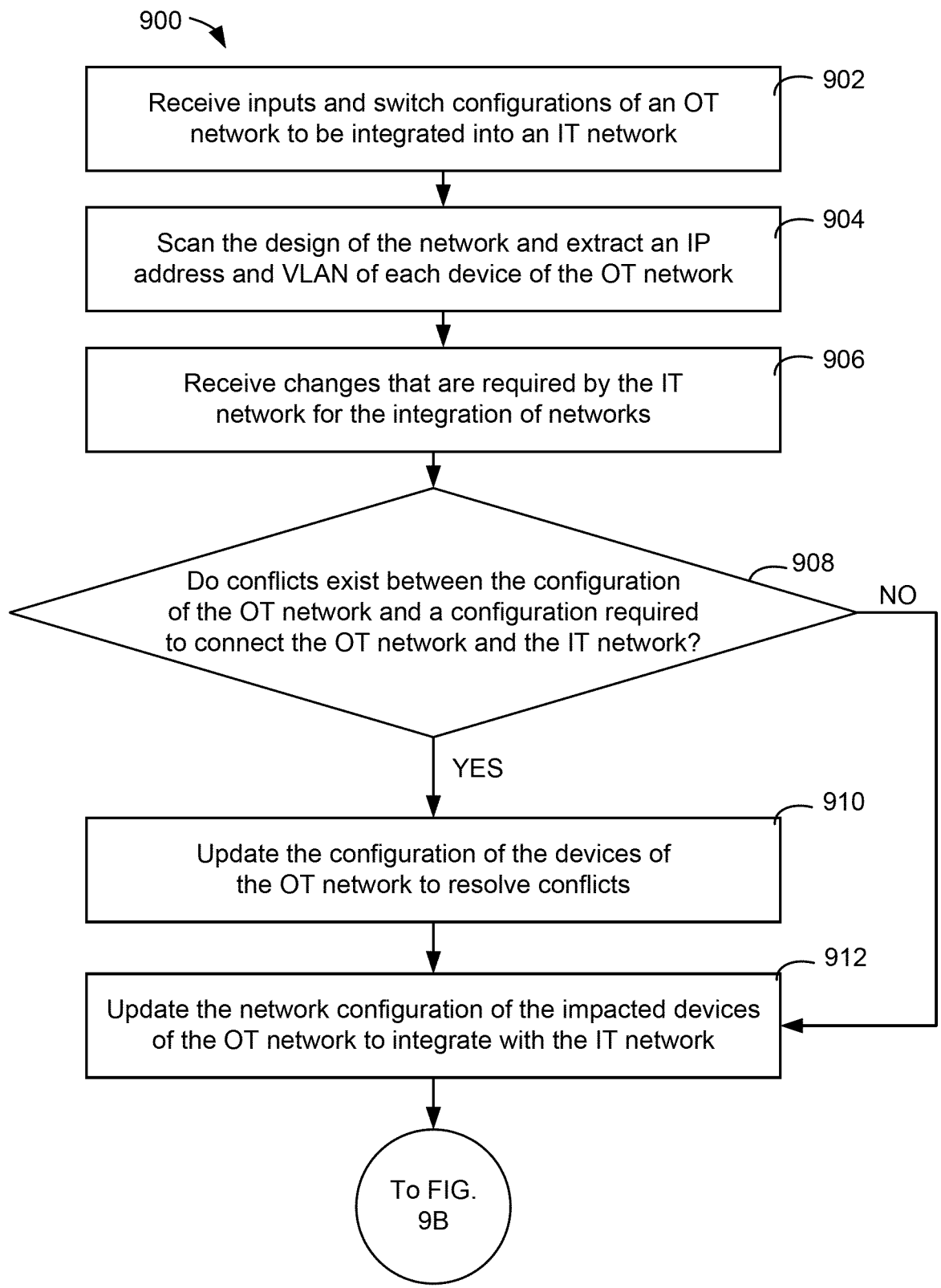
FIG. 9A is a flow diagram illustrating a technique which can be used to interconnect networks within the building of FIG. 1, according to some embodiments.
Figure 9B:
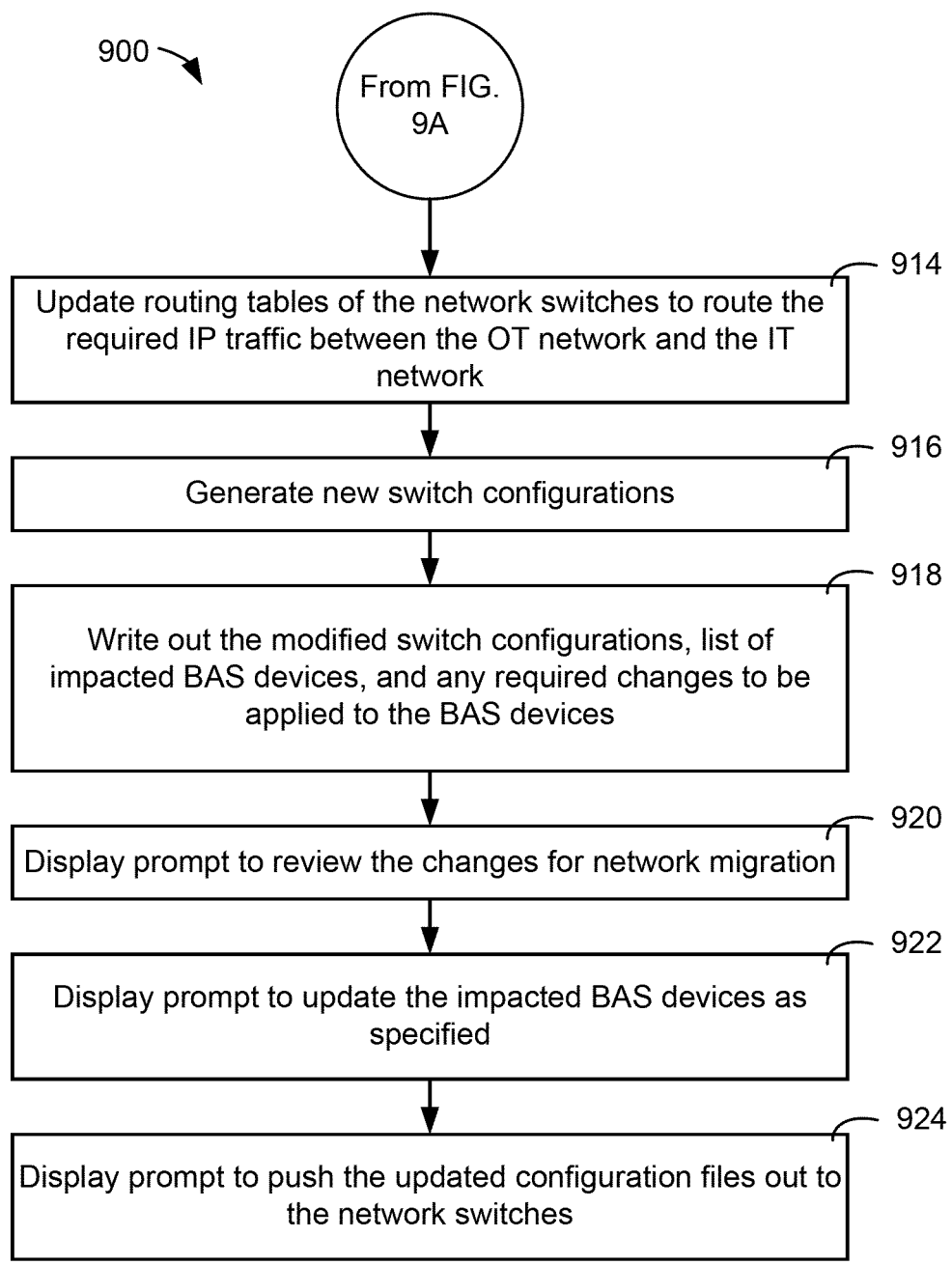
FIG. 9B is a flow diagram continuing the process of FIG. 9A, according to some embodiments.

Referring now to FIGS. 9A and 9B, a flow diagram illustrating a technique which can be used to interconnect networks within the building of FIG. 1 is shown, according to an exemplary embodiment. Process 900 may be performed by various components of interconnecting network tool 502. For example, conflict detector 610, configuration wizard 612, device handler 614, network handler 616, network information receiver 618, and/or user interface generator 620 may be configured to perform various steps of process 900.

Referring now to FIG. 9A, process 900 can include receiving inputs and switch configurations of an OT network to be integrated into an IT network (step 902). An OT network 506 may already be installed at the building site (i.e. building 10). For instance, network information receiver 618 can receive inputs comprising information specific to OT network 506. Network information receiver 618 may receive or obtain inputs from one or more storage devices or databases, another device within or outside of system 500, and/or the OT network 506 itself. Information received may include IP addresses, switch configurations, VLANS, etc.

Process 900 can include scanning the design of the network and extracting an IP address and VLAN of each device of the network (step 904). Device handler 614, network handler 616, configuration wizard 612, and/or network information receiver 618 may be configured to examine the network design of OT network 506. From its examination, one of those components be able to determine a list of devices that are on that network, along with their IP addresses and VLANs. Each device of the network may be a BAS device 508 described in connection to FIG. 5.

Process 900 can include receiving changes that are required by the IT network for the integration of networks (step 906). Via communications interface 604 the configuration wizard 612 may receive any changes required by the IT network 504 to allow for successful integration of the networks. The changes may include IP addresses and VLANs for equipment that will reside in the address space of the IT network 504 after the migration. The changes may also include the default gateway address for the BAS devices that need to access IT services. For example, a BAS device 508 may require internet connection and therefore would need access to the IT services. In some embodiments, configuration wizard 612 may determine the changes to OT network 506 required by IT network 504.

Still referring to FIG. 9A, process 900 can include determining if conflicts exist between the configuration of the network and a configuration required to connect the network and the IT network (step 908). Configuration wizard 612 may determine that conflicts existing between the current configuration of the OT network 506 and the configuration required to connect the OT network 506 and the IT network 504. For example, conflicts may include overlapping or conflicting subnets, VLANS, duplicate addresses, etc. If any conflicts are detected, process 900 may proceed to step 910. Otherwise, process 900 may proceed to step 912 to continue with the interconnecting of networks.

Upon determination of existing conflicts (i.e., the result of step 908 is "YES"), process 900 can include updating the configuration of the devices of the OT network to resolve the detected conflicts (step 910). Step 910 may include, for example, updating IP address ranges used by the devices of the OT network 506 to avoid conflicts with the IP address ranges used by the devices of the IT network 504. In some embodiments, step 910 includes generating a user interface that identifies any detected conflicts and/or the corrective actions taken to resolve the conflicts. User interface generator 620 may receive notification from configuration wizard 612 that conflicts exist and may generate a user interface displaying information regarding the existing conflicts. User interface generator 620 may display the user interface on client device 512 via communications interface 604. A user (i.e. user 510) may view the user interface generated by user interface generator 620 on client device 512. Once the conflicts are displayed, interconnecting network tool 502 may terminate process 900. User 510 may review the conflicts and make the necessary changes to the networks and/or devices. Once user 510 believes the conflicts are resolved, user 510 may start process 900 again, for example using interconnecting network tool 502 via a client device 512.

Upon determination of no existing conflicts (i.e., the result of step 908 is "NO), process 900 can include updating the network configuration of the impacted devices of the network (step 912). In some embodiments, step 912 includes any remaining updates to the network configuration needed to integrate the devices of the OT network 506 with the IT network 504. For example, step 912 may include updating the routed port of OT aggregation switch 710, which connects the OT network to the IT network 504. Updating the routed port of OT aggregation switch 710 may connect OT aggregation switch 710 to IT switch 702, which may be any of a variety of types of IT switches within IT network 504 including, for example, an IT distribution switch, an IT core switch, or an IT access switch. As necessary, the interconnecting network tool 502 may update the network configuration of the impacted devices of OT network 506 and/or IT network 504. The list of impacted devices may come from step 904 and/or step 906. Impacted devices may include a single or a plurality of BAS devices 508. Updating the network configuration may include specifying the correct IP addresses and route settings, setting up a network connection to enable communication, modifying existing addresses, etc.

Referring now to FIG. 9B, process 900 can include updating the routing tables of the network switches to route the required IP traffic between the OT network and the IT network (step 914). In some embodiments, one or more routing tables may be updated to route the traffic accordingly. For example, the routing table of OT network 506 may be updated such that all traffic not destined for an OT subnet or the IT VLAN/subnet 804 is now directed to IT network 504. In some embodiments, the traffic of OT network 506 does not need to be exposed to IT network 504 remains within OT network 506. In some embodiments, step 914 includes updating the configuration of both the IT network switches and the OT network switches. For example, step 914 may include updating the routing tables of both the IT network switches and the OT network switches to provide bidirectional routing between the IT network 504 and the OT network 506. In other embodiments, the updates in step 914 may exclude updates to the IT network switches, in which case the routing tables of the IT network switches are not automatically updated in step 914. In this case, updates to the IT network switches may be implemented manually by IT personnel in response to receiving a list of required changes in step 918.

Process 900 can include generating new switch configurations (step 916). Configuration wizard 612 may generate new network switch configurations to update the route of traffic to and from the OT network 506 and IT network 504. Generating new switch configurations may include generating new IP addresses that are in the network address space of the new network. For example, interconnecting network tool 502 may generate new network switch configurations for the OT access switches (i.e. OT access switches 714, 716) such that the new configurations have IP addresses in the network address space of IT network 504.

Process 900 can include writing out the modified switch configurations, a list of impacted building automation system (BAS) devices, and any required changes to be applied to the BAS devices (step 918). Step 918 can be performed to indicate any remaining changes that are required to integrate the OT network 506 with the IT network 504 in addition to the changes automatically implemented by previous steps of process 900. For example, if step 912 is limited to only updating the configuration of the OT network switches, step 918 may include a list of required updates to the IT network switches (e.g., the additional route to route to the IT VLAN/subnet 804 through the routed port of the OT aggregation switch 810). In various embodiments, the remaining updates can be implemented manually, semi-automatically, or fully automatically. Configuration wizard 612 may write out the modified switch configurations to be pushed out in step 918. Configuration wizard 612 may write out the list of impacted devices (i.e. BAS devices that are not switches, etc.) to be updated in step 922. Required changes may include updating a device's IP address their new IP address in the IT network 504, update a device's default gateway to their new default gateway, etc. In some embodiments, step 918 is automatically performed through an API or other tool specific for the task (similar to the push process described with reference to step 924).

Still referring to FIG. 9B, process 900 can include displaying a prompt to review the changes for the network migration (step 920). Interconnecting network tool 502 may display a user interface on a client device 512 via the communications interface 604 displaying the changes for the network migration, along with a prompt for someone responsible for the migration to review the changes. A user 510 may view the user interface on the client device 512 to review to the changes for the network migration. If the user 510 agrees with the suggested changes, process 900 may proceed with step 922. In the case that the user 510 does not agree with the suggested changes for various reasons, the user 510 may elect to not continue with process 900.

Process 900 can include displaying a prompt to update the impacted building automation system (BAS) devices as specified (step 922). For example, interconnecting network tool 502 may display a user interface on a client device 512 via the communications interface 604 prompting to update the impacted BAS devices as specified. A user 510 may view the user interface on the client device 512 in order to assess the impacted BAS devices and how they need to be updated. The list of impacted BAS devices may be produced in step 918. The user 510 may update the BAS devices listed accordingly. In a manual embodiment, the user may implement the remaining changes manually. In a semi-automatic embodiment, the user may be presented with a list of required or recommended changes to approve. Upon receiving approval from the user, the changes may be automatically implemented (e.g., using an API or remote configuration tool). In a fully automatic embodiment, the required or recommended changes may be implemented automatically, without requiring confirmation or approval from the user. If the user 510 does not update the BAS devices (i.e. BAS devices 508) interconnecting network tool 502 specifies, process 900 may not be able to proceed with step 924 and the network migration may not be completed.

Process 900 can include displaying a prompt to push the updated configuration files out to the network switches (step 924). Interconnecting network tool 502 may display a user interface on a client device 512 via the communications interface 604 prompting to push the updated configuration files out to the network access switches (i.e. OT access switches, etc.). A user 510 may view the user interface on the client device 512 and determine that they need to push the updated configuration files out to the network switches. The user 510 may push the updated configuration files out to the network switches. Once all of the network switches are reloaded, the network connection can be complete. However, if the user 510 decides not to push the updated configuration files out to the network switches or if all of the network switches are not reloaded, the network migration may fail and may not be complete.

Systems and methods as described herein in this disclosure provide advantages over traditional methods for installing and configuring OT and IT networks. Occasionally OT networks are installed before the IT network, therefore requiring changes to the existing isolated OT network once the IT network is subsequently installed. The changes required to reconfigure and connect the networks can be timely and a highly manual process requiring great effort. In contrast, as described herein above in this disclosure, systems and methods of the present disclosure minimizes the time and effort required to reconfigure a previously isolated OT network to connect to the IT network by automating the process and determining the smallest set of changes that are necessary.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A network system for a building, the network system comprising:
    an operational technology (OT) network, the OT network comprising:
        a plurality of OT devices configured to have network addresses within at least one subnet of the OT network;
        a plurality of OT network switches communicably coupled to the plurality of OT devices, the plurality of OT network switches configured to have network addresses within the at least one subnet of the OT network; and
        a routing table associated with the plurality of OT network switches;
    an information technology (IT) network configured to perform IT operations of the building, the IT network comprising:
        a plurality of IT devices configured to have network addresses within at least one subnet of the IT network; and
        at least one IT network switch communicably coupled to the plurality of IT devices, the at least one IT network switch configured to have at least one network address within the at least one subnet of the IT network;
    a network tool configured to connect the OT network and the IT network, the network tool comprising a processing circuit configured to:
        obtain a current network configuration of the plurality of OT network switches, wherein the current network configuration comprises at least one of the network addresses of the plurality of OT network switches and the routing table associated with the plurality of OT network switches;
        update the routing table to route network traffic between the OT network and the IT network; and
        update the network addresses of the plurality of OT network switches to have network addresses within the at least one subnet of the IT network.

2. The network system of claim 1, wherein the processing circuit is further configured to:
    receive a new configuration of the OT network required by the IT network for the connecting of the OT network and the IT network; and determine if a conflict exists between (1) the current network configuration of the plurality of OT network switches and the plurality of OT devices and (2) the new configuration of the OT network.

3. The network system of claim 2, wherein the processing circuit is further configured to update a configuration of one or more OT devices, of the plurality of OT devices, that are impacted by the new configuration of the OT network.

4. The network system of claim 3, wherein the processing circuit is further configured to display, via a client device, the new configuration of the OT network and a list of the OT devices that are impacted by the new configuration of the OT network.

5. The network system of claim 2, wherein the processing circuit is further configured to, responsive to determining if a conflict exists, determine whether manual changes are required for the OT network to be connected with the IT network.

6. The network system of claim 5, wherein the processing circuit is further configured to display, via a client device, the manual changes required for the OT network to be connected with the IT network.

7. The network system of claim 1, wherein at least one of the plurality of OT network switches functions as an aggregation switch configured to connect the plurality of OT network switches.

8. A method for connecting an operational technology (OT) network with an information technology (IT) network in a building automation system, the method comprising:
obtaining a current network configuration of a plurality of OT network switches in an OT network, wherein the current network configuration comprises at least one of the network addresses of the plurality of OT network switches and a routing table associated with the plurality of OT network switches;
updating the routing table to route network traffic between the OT network and an IT network; and
updating the network addresses of the plurality of OT network switches to have network addresses within at least one subnet of the IT network.

9. The method of claim 8, further comprising:
receiving a new configuration of the OT network that is required by the IT network for the connecting of the OT network and the IT network; and
determining if a conflict exists between (1) the current network configuration for the plurality of OT network switches and a plurality of OT devices of the OT network and (2) the new configuration of the OT network.

10. The method of claim 9, further comprising updating a configuration of one or more OT devices, of the plurality of OT devices, that are impacted by the new configuration of the OT network.

11. The method of claim 10, further comprising displaying, via a client device, the new configuration of the OT network and a list of the OT devices that are impacted by the new configuration of the OT network.

12. The method of claim 9, further comprising responsive to determining if a conflict exists, determining if manual changes are required for the OT network to be connected with the IT network.

13. The method of claim 12, further comprising displaying, via a client device, the manual changes required for the OT network to be connected with the IT network.

14. A network tool for connecting an operational technology (OT) network with an information technology (IT) network in a building automation system, the network tool comprising a processing circuit configured to:
obtain a current network configuration of a plurality of OT network switches in an OT network, wherein the current network configuration comprises at least one of the network addresses of the plurality of OT network switches and a routing table associated with the plurality of OT network switches;
update the routing table to route network traffic between the OT network and an IT network; and
update the network addresses of the plurality of OT network switches to have network addresses within at least one subnet of the IT network.

15. The network tool of claim 14, wherein the processing circuit is further configured to:
receive a new configuration of the OT network that is required by the IT network for the connecting of the OT network and the IT network; and
determine if a conflict exists between (1) the current network configuration for the plurality of OT network switches and a plurality of OT devices of the OT network and (2) the new configuration of the OT network.

16. The network tool of claim 15, wherein the processing circuit is further configured to update a configuration of one or more OT devices, of the plurality of OT devices, that are impacted by the new configuration of the OT network.

17. The network tool of claim 16, wherein the processing circuit is further configured to display, via, a client device, the new configuration of the OT network and a list of the OT devices that are impacted by the new configuration of the OT network.

18. The network tool of claim 15, wherein the processing circuit is further configured to responsive to determining if a conflict exists, determine if manual changes are required for the OT network to be connected with the IT network.

19. The network tool of claim 18, wherein the processing circuit is further configured to display, via a client device, the manual changes required for the OT network to be connected with the IT network.

20. The network tool of claim 14, wherein at least one of the plurality of OT network switches functions as an aggregation switch to connect the plurality of OT network switches.

* * * * *